(12) United States Patent
Enomoto

(10) Patent No.: US 6,922,290 B2
(45) Date of Patent: Jul. 26, 2005

(54) ZOOM LENS SYSTEM

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/457,485

(22) Filed: Jun. 10, 2003

(65) Prior Publication Data

US 2004/0001260 A1 Jan. 1, 2004

(30) Foreign Application Priority Data

Jun. 14, 2002 (JP) ........................................ 2002-174361
Jun. 17, 2002 (JP) ........................................ 2002-175393

(51) Int. Cl.⁷ ............................................. G02B 15/14
(52) U.S. Cl. ...................................................... 359/692
(58) Field of Search ......................................... 359/692

(56) References Cited

U.S. PATENT DOCUMENTS

| | | | |
|---|---|---|---|
| 5,596,453 A | * | 1/1997 | Kim ............................ 359/692 |
| 5,751,498 A | | 5/1998 | Ito |
| 5,930,052 A | | 7/1999 | Enomoto et al. |
| 6,072,638 A | | 6/2000 | Enomoto |
| 6,172,819 B1 | | 1/2001 | Enomoto et al. |
| 6,236,518 B1 | | 5/2001 | Enomoto |
| 6,268,965 B1 | | 7/2001 | Enomoto |
| 6,268,966 B1 | | 7/2001 | Ishii et al. |
| 6,297,914 B1 | | 10/2001 | Enomoto |
| 6,570,716 B2 | * | 5/2003 | Morooka et al. ........... 359/692 |

FOREIGN PATENT DOCUMENTS

JP          7-306361        11/1995

* cited by examiner

*Primary Examiner*—Scott J. Sugarman
*Assistant Examiner*—Deborah Raizen
(74) *Attorney, Agent, or Firm*—Greenblum & Bernstein, P.L.C.

(57) ABSTRACT

A zoom lens system includes a positive first lens group, a negative second lens group. Zooming is performed by moving the first and second lens groups in the optical axis direction thereof. The most image-side lens element of the positive first lens group includes a positive lens element having at least one aspherical surface. The zoom lens system satisfies the following conditions:

$$4.5 < f_T/f_{1G} < 5.5 \quad (1)$$

$$3.5 < f_T/f_{Lasp} < 5.5 \quad (2)$$

wherein $f_T$ designates the focal length of the zoom lens system at the long focal length extremity;

$f_{1G}$ designates the focal length of the positive first lens group; and $f_{Lasp}$ designates the focal length of the positive lens element having the aspherical surface in the positive first lens group.

9 Claims, 13 Drawing Sheets

Fig. 1
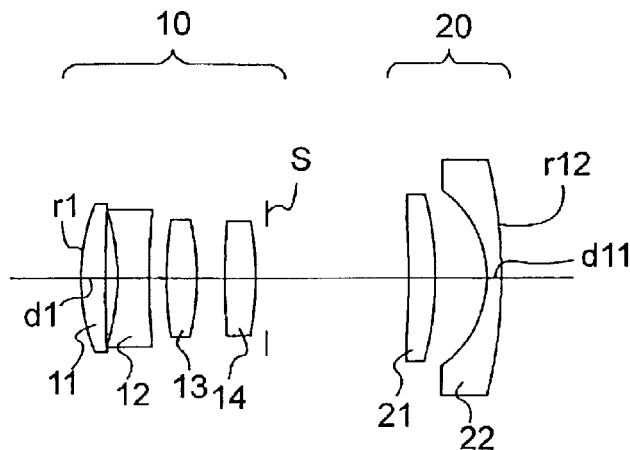
Fig. 2A
$F_{NO.}= 5.6$
—— d Line
········ g Line
--- C Line
-1.0  1.0
SPHERICAL
ABERRATION
CHROMATIC
ABERRATION
Fig. 2B
W=28.5°
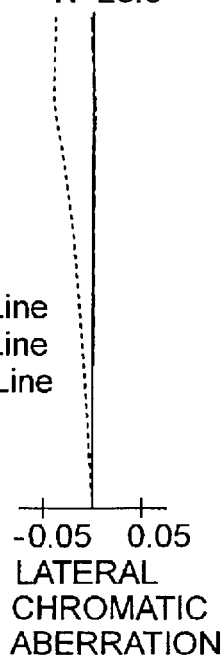
-0.05  0.05
LATERAL
CHROMATIC
ABERRATION
Fig. 2C
W=28.5°
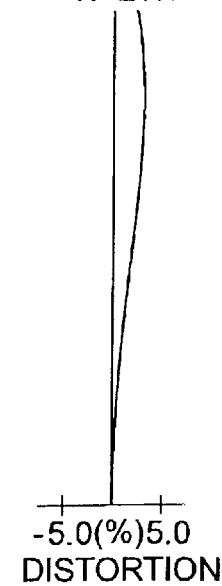
—— S
-- M
-1.0  1.0
ASTIGMATISM
Fig. 2D
W=28.5°
-5.0(%)5.0
DISTORTION

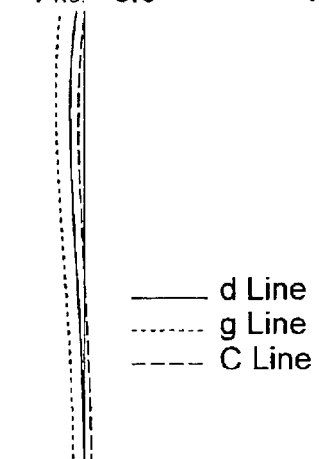
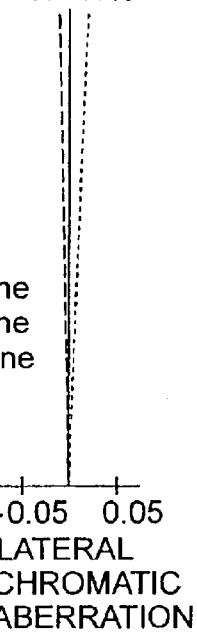
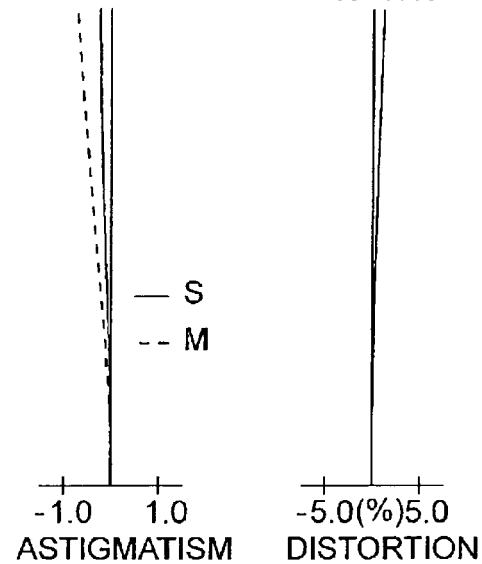
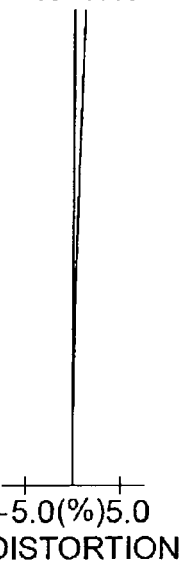
Fig. 3A  Fig. 3B  Fig. 3C  Fig. 3D
F$_{NO.}$= 8.0   W=17.0°  W=17.0°  W=17.0°
— d Line
······ g Line
---- C Line
— S
-- M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0(%)5.0
DISTORTION
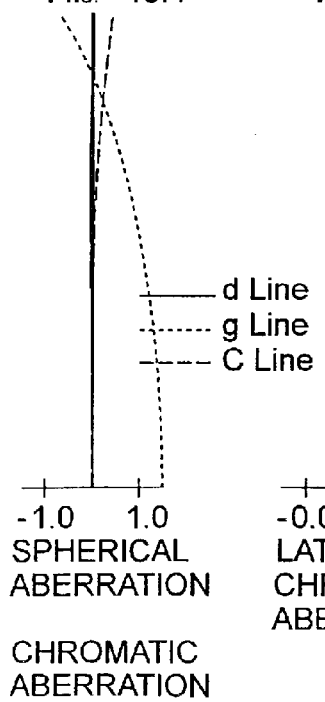
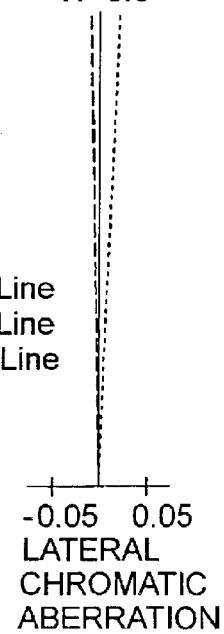
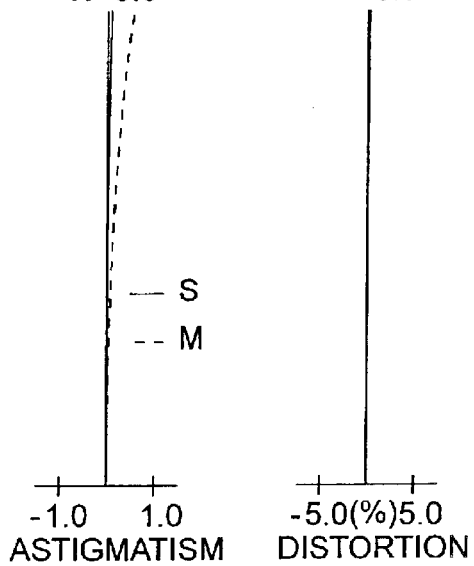
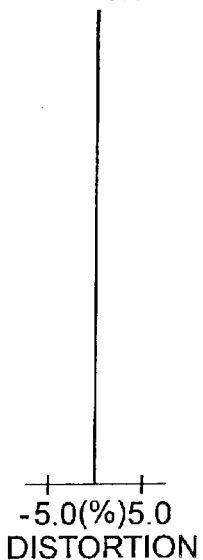
Fig. 4A  Fig. 4B  Fig. 4C  Fig. 4D
F$_{NO.}$= 13.4  W=9.0°  W=9.0°  W=9.0°
— d Line
······ g Line
---- C Line
— S
-- M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0(%)5.0
DISTORTION F_No.= 5.6

—— d Line
······ g Line
---- C Line

-1.0  1.0
SPHERICAL
ABERRATION

CHROMATIC
ABERRATION

W=28.5°

-0.05  0.05
LATERAL
CHROMATIC
ABERRATION

W=28.5°

—— S
-- M

-1.0  1.0
ASTIGMATISM

W=28.5°

-5.0(%)5.0
DISTORTION

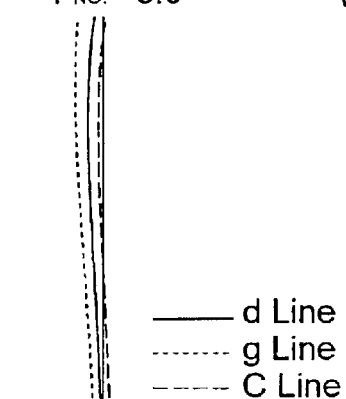
Fig. 7A  F_{NO.}= 8.0
SPHERICAL ABERRATION
CHROMATIC ABERRATION
d Line / g Line / C Line
-1.0  1.0
Fig. 7B  W=16.9°
LATERAL CHROMATIC ABERRATION
-0.05  0.05
Fig. 7C  W=16.9°
ASTIGMATISM
S / M
-1.0  1.0
Fig. 7D  W=16.9°
DISTORTION
-5.0(%) 5.0
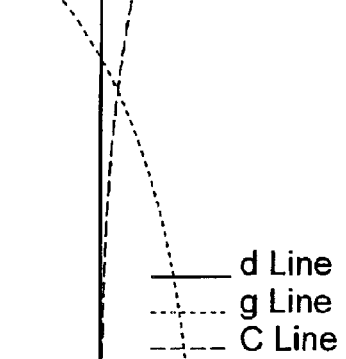
Fig. 8A  F_{NO.}= 13.4
SPHERICAL ABERRATION
CHROMATIC ABERRATION
d Line / g Line / C Line
-1.0  1.0
Fig. 8B  W=8.9°
LATERAL CHROMATIC ABERRATION
-0.05  0.05
Fig. 8C  W=8.9°
ASTIGMATISM
S / M
-1.0  1.0
Fig. 8D  W=8.9°
DISTORTION
-5.0(%) 5.0

Fig. 9
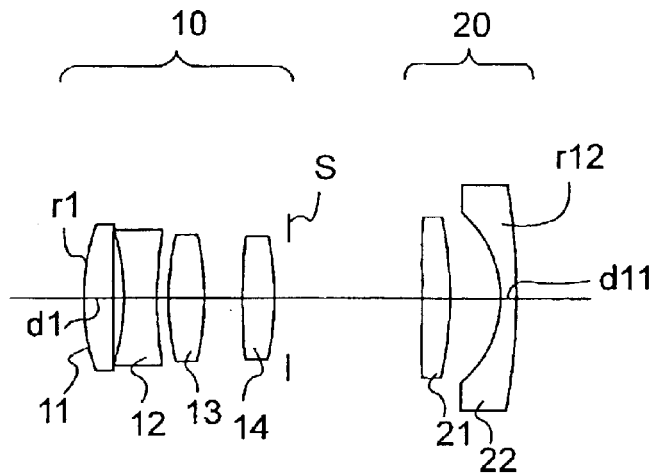
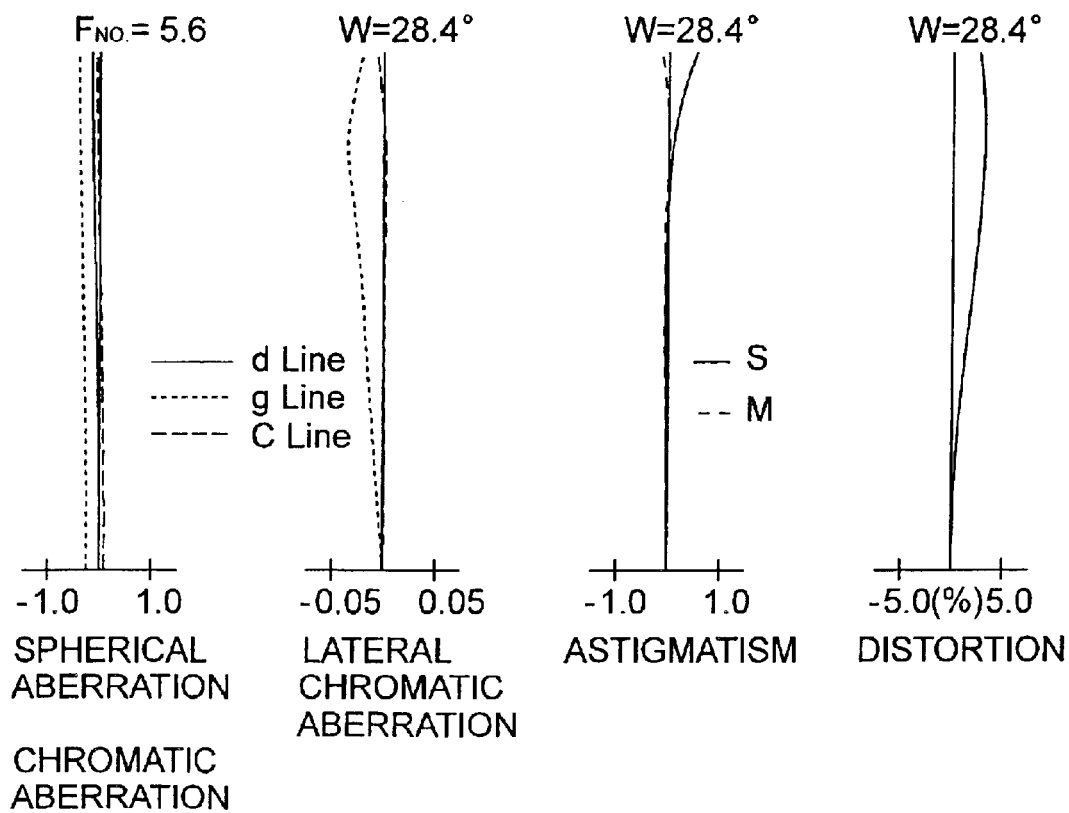

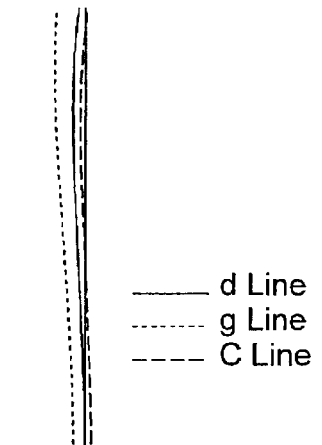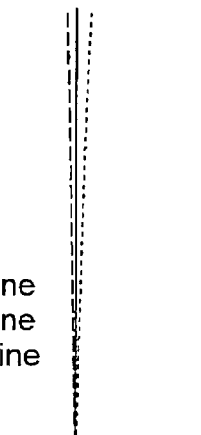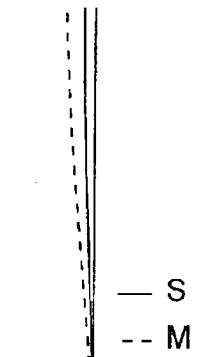
Fig. 11A  Fig. 11B  Fig. 11C  Fig. 11D
$F_{NO.}=8.0$  W=16.9°  W=16.9°  W=16.9°
— d Line
······ g Line
---- C Line
— S
-- M
-1.0  1.0   -0.05  0.05   -1.0  1.0   -5.0(%)5.0
SPHERICAL   LATERAL      ASTIGMATISM   DISTORTION
ABERRATION  CHROMATIC
            ABERRATION
CHROMATIC
ABERRATION
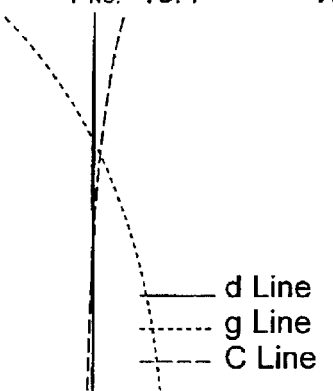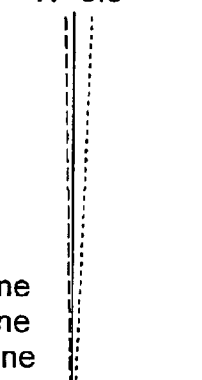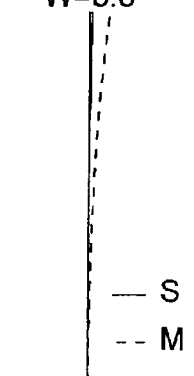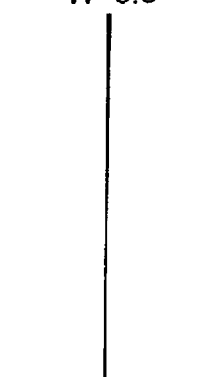
Fig. 12A  Fig. 12B  Fig. 12C  Fig. 12D
$F_{NO.}=13.4$  W=8.8°  W=8.8°  W=8.8°
— d Line
······ g Line
---- C Line
— S
-- M
-1.0  1.0   -0.05  0.05   -1.0  1.0   -5.0(%)5.0
SPHERICAL   LATERAL      ASTIGMATISM   DISTORTION
ABERRATION  CHROMATIC
            ABERRATION
CHROMATIC
ABERRATION F_No.= 5.6 d Line
g Line
C Line

-1.0   1.0
SPHERICAL
ABERRATION
CHROMATIC
ABERRATION

W=28.5°

-0.05  0.05
LATERAL
CHROMATIC
ABERRATION

W=28.5°

— S
-- M

-1.0   1.0
ASTIGMATISM

W=28.5°

-5.0(%)5.0
DISTORTION

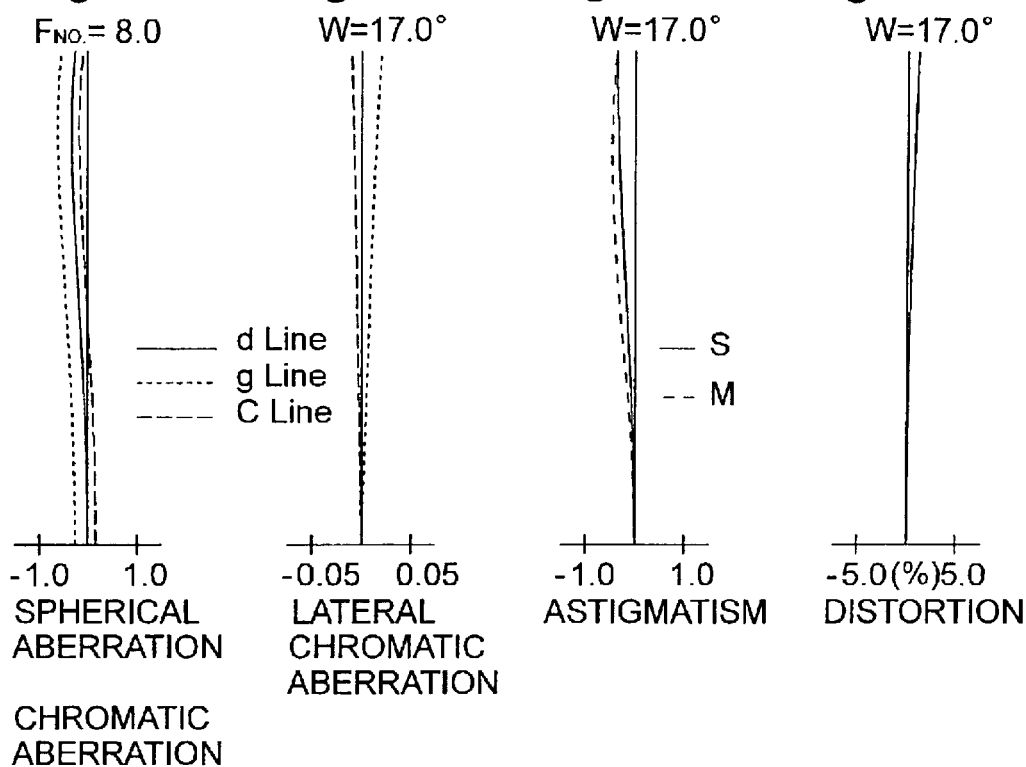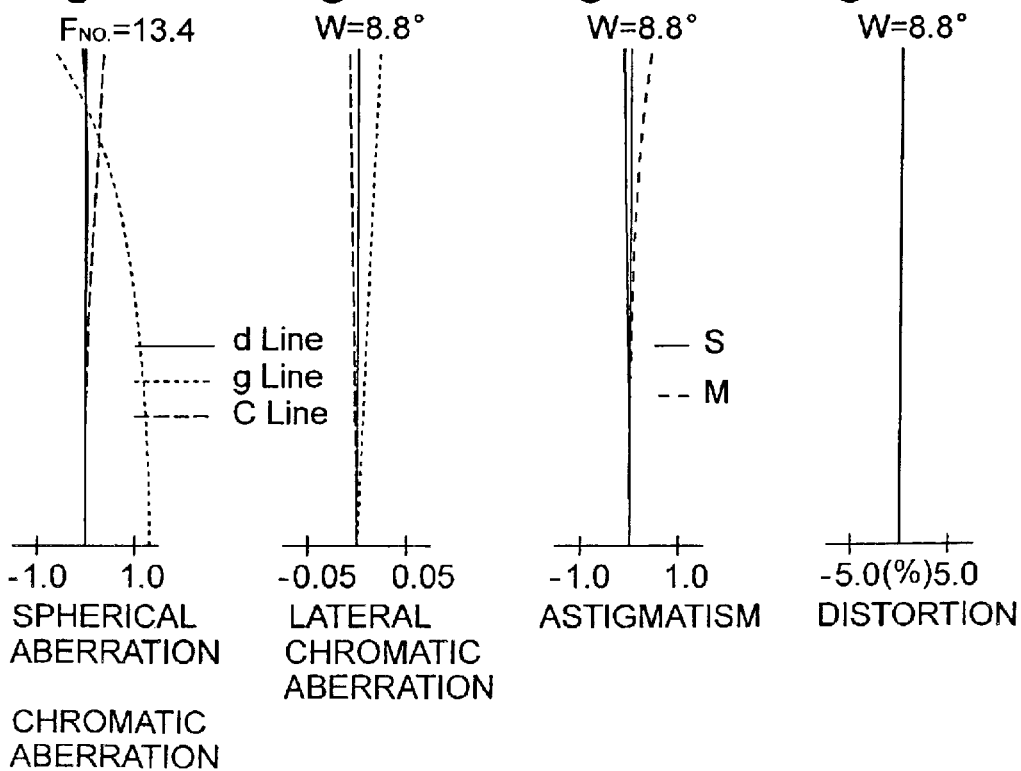

Fig. 17
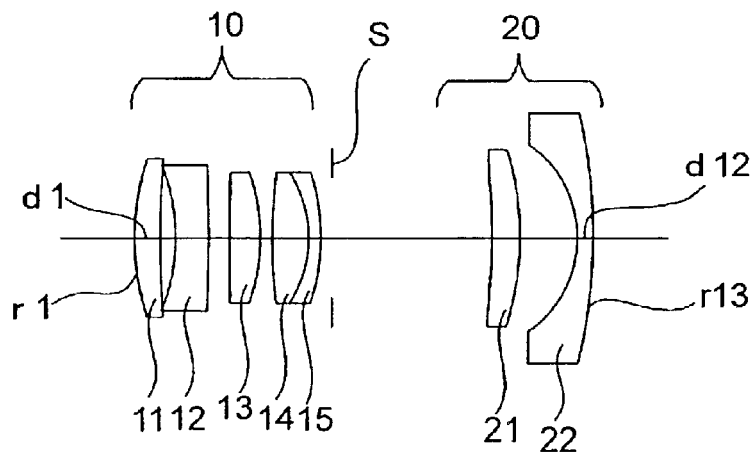
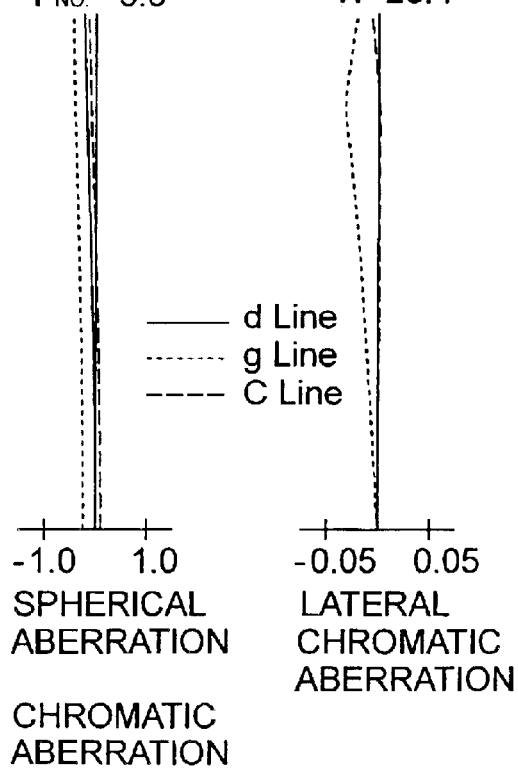
Fig. 18A
$F_{NO.}= 5.6$
—— d Line
········ g Line
---- C Line
-1.0    1.0
SPHERICAL
ABERRATION
CHROMATIC
ABERRATION
Fig. 18B
W=28.4°
-0.05   0.05
LATERAL
CHROMATIC
ABERRATION
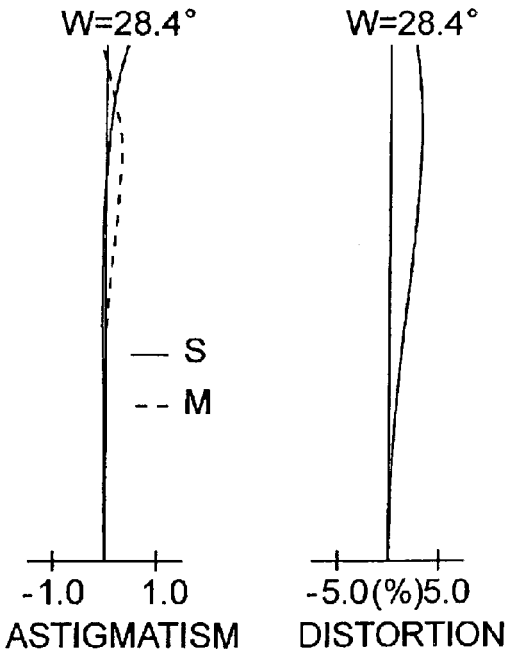
Fig. 18C
W=28.4°
—— S
-- M
-1.0   1.0
ASTIGMATISM
Fig. 18D
W=28.4°
-5.0(%)5.0
DISTORTION

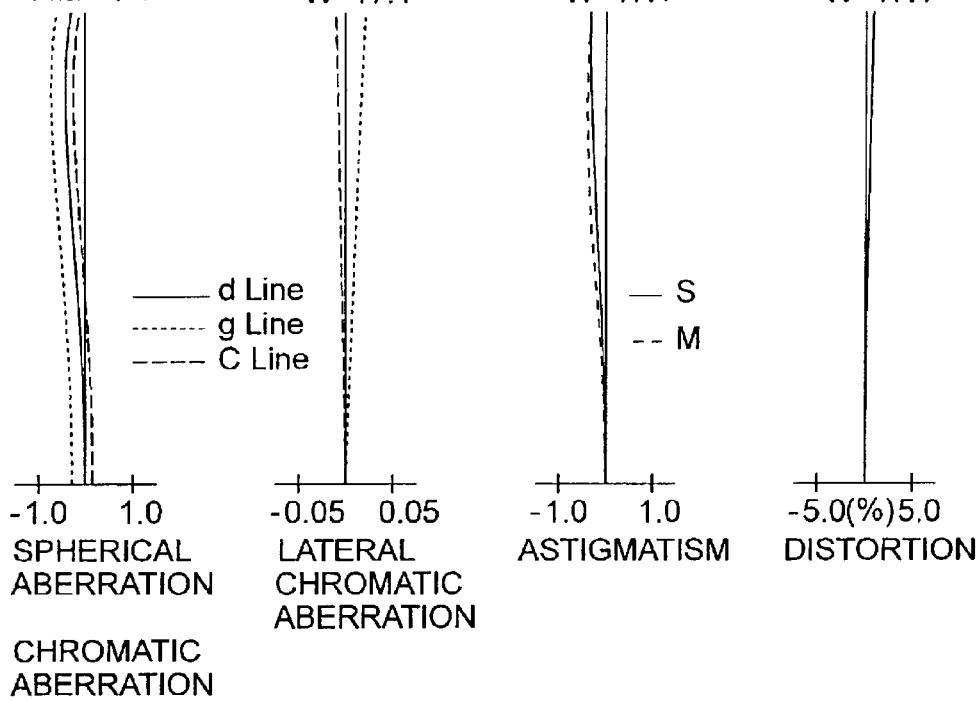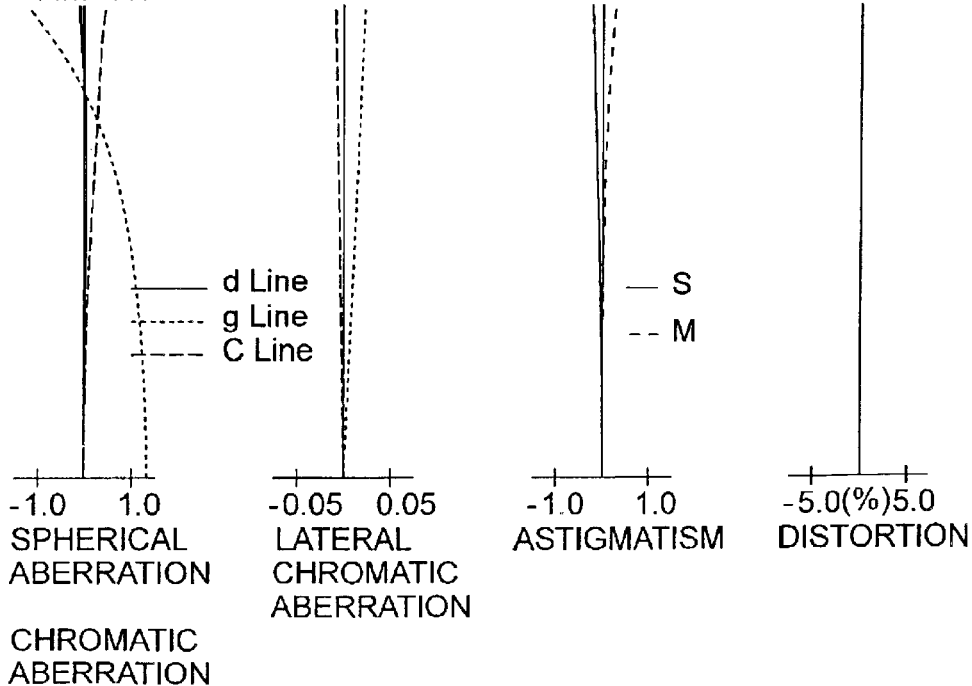

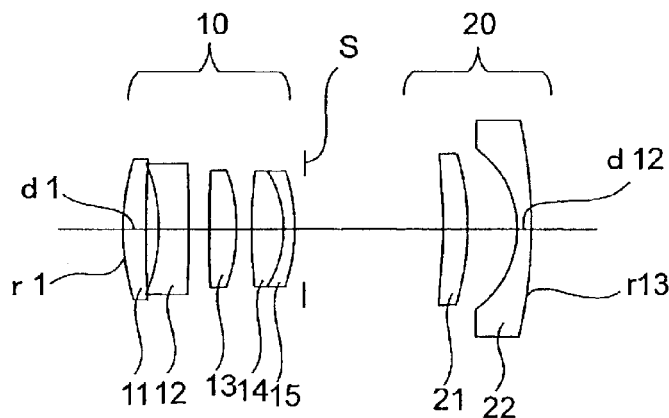
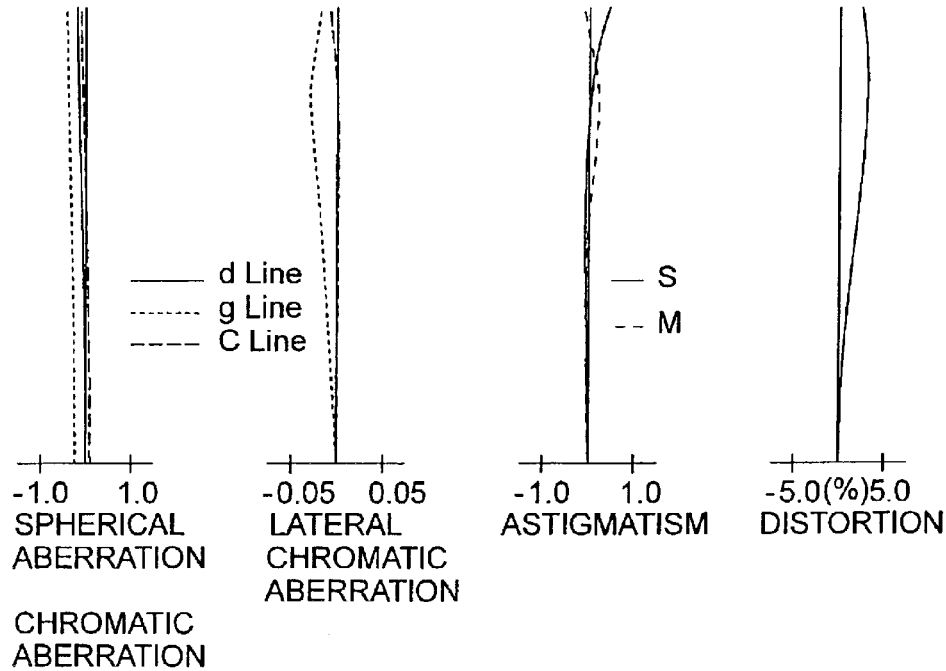

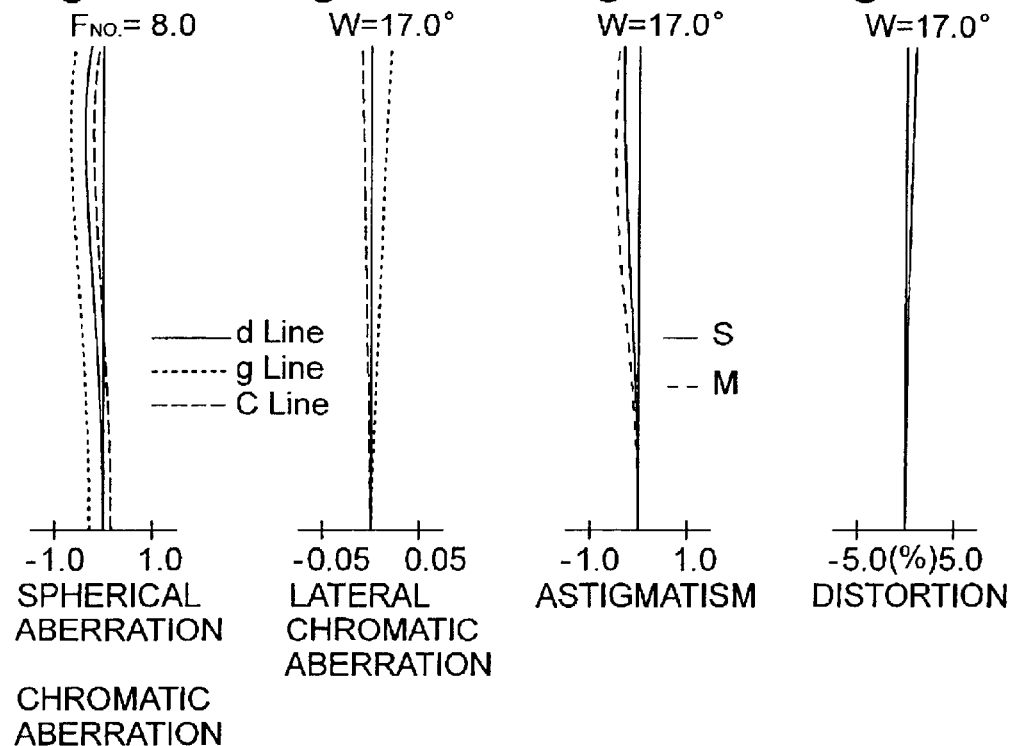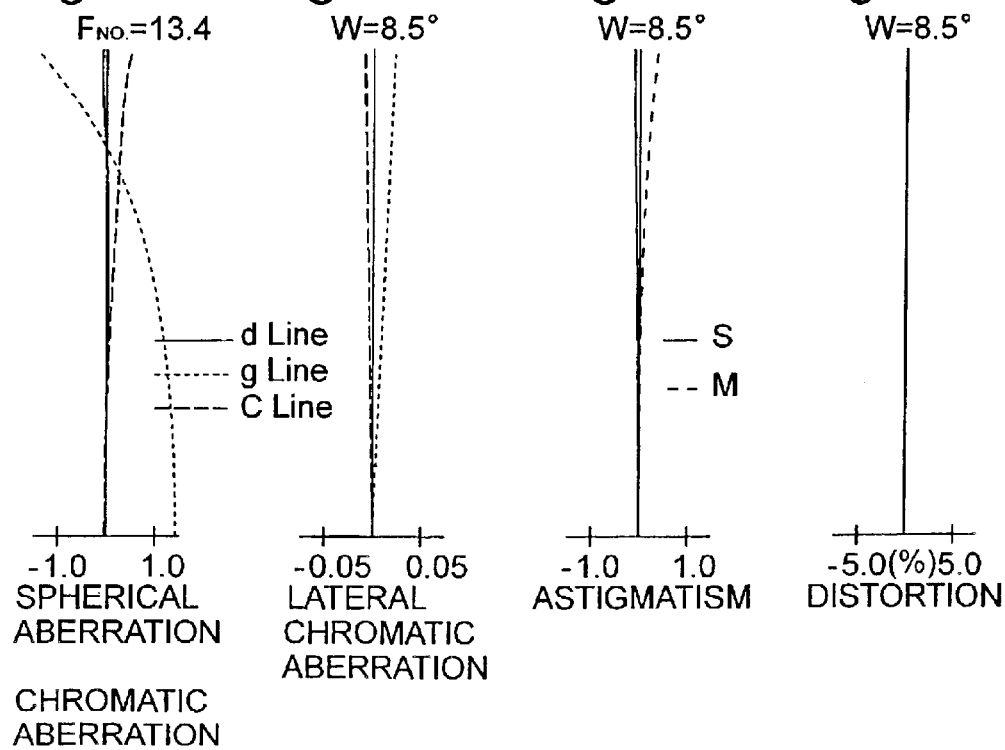

ZOOM LENS SYSTEM

BACKGROUND OF THE INVENTION

1. Field of the Invention

The present invention relates to a compact zoom lens system of a two-lens-group arrangement having a short back focal distance, which is suitable for a lens-shutter camera.

2. Description of the Prior Art

Unlike a zoom lens system of a single lens reflex (SLR) camera which requires space to accommodate a quick-return mirror behind the photographing lens system, a zoom lens system of a compact camera does not require a long back focal distance. As a zoom lens system for a lens-shutter camera having little constraints on the back focal distance, a telephoto-type zoom lens system is suitable for achieving further compactness of a camera. Here, note that a telephoto-type zoom lens system includes a front lens group having a positive power (hereinafter, positive front lens group) and a rear lens group having a negative power (hereinafter, negative rear lens group) in this order from the object; and zooming is performed by varying the distance between the positive front lens group and the negative rear lens group.

However, if an attempt is made to achieve a zoom ratio of 3 or more in this telephoto-type zoom lens system, a zoom lens system of a three-lens-group arrangement which is a modification of a telephoto-type zoom lens system has to be employed. Consequently, the diameter of the positive front lens group is increased, and the structure and the size of the zoom lens system become more complicated and larger.

SUMMARY OF THE INVENTION

The present invention provides a zoom lens system for a small and compact camera having a two-lens-group arrangement and a zoom ratio of approximately 3.5.

According to a first aspect of the present invention, there is provided a zoom lens system including a positive first lens group, a negative second lens group, in this order from the object. zooming is performed by moving the first and second lens groups in the optical axis direction. The most image-side lens element of the positive first lens group includes a positive lens element having at least one aspherical surface. The zoom lens system satisfies the following conditions:

$$4.5 < f_T/f_{1G} < 5.5 \quad (1)$$

$$3.5 < f_T/f_{Lasp} < 5.5 \quad (2)$$

wherein $f_T$ designates the focal length of the zoom lens system at the long focal length extremity;

$f_{1G}$ designates the focal length of the positive first lens group; and $f_{Lasp}$ designates the focal length of the positive lens element having the aspherical surface in the positive first lens group.

More preferably, the zoom lens system satisfies the following condition instead of the above condition (1):

$$4.7 < f_T/f_{1G} < 5.5 \quad (1')$$

The positive first lens group can include a four-lens-element arrangement, i.e., a positive lens element having aconvex surface facing toward the object, a negative lens element, a positive lens element, and the positive lens element having the aspherical surface, in this order from the object. The zoom lens system can satisfy the following condition:

$$4 < f_T/f_{L3} < 6 \quad (3)$$

wherein $f_{L3}$ designates the focal length of the third positive lens element from the object in the positive first lens group.

In the positive first lens group, the above third lens element and the positive lens element having the aspherical surface preferably satisfy the following condition:

$$1 < f_{Lasp}/f_{L3} < 1.5 \quad (4)$$

On the other hand, the negative second lens group preferably satisfies the following condition:

$$-7 < f_T/f_{2G} < -5 \quad (5)$$

wherein $f_{2G}$ designates the focal length of the negative second lens group.

Furthermore, the zoom lens system preferably satisfies the following condition:

$$3.2 < f_T/f_W \quad (6)$$

wherein $f_W$ designates the focal length of the zoom lens system at the short focal length extremity.

Still further, in the zoom lens system, the positive lens element having the aspherical surface in the positive first lens group can satisfy the following condition:

$$-10 < \Delta I_{ASP} < -3 \quad (7)$$

wherein $\Delta I_{ASP}$ designates the amount of change of the spherical aberration coefficient due to the aspherical surface under the condition that the focal length at the short focal length extremity is converted to 1.0.

In the zoom lens system, the negative second lens group preferably includes a lens element having at least one aspherical surface, and the lens element satisfies the following condition:

$$0 < \Delta V_{ASP} < 0.6 \quad (8)$$

wherein $\Delta V_{ASP}$ designates the amount of change of the distortion coefficient due to the aspherical surface under the condition that the focal length at the short focal length extremity is converted to 1.0.

According to a second aspect of the present invention, there is provided a zoom lens system including a positive first lens group, a negative second lens group, in this order from the object. Zooming is performed by moving the first and second lens groups in the optical axis direction thereof. The zoom lens system satisfies the following condition:

$$4.5 < f_T/f_{1G} < 5.5 \quad (1)$$

wherein $f_T$ designates the focal length of the zoom lens system at the long focal length extremity; and $f_{1G}$ designates the focal length of the positive first lens group.

More preferably, the zoom lens system satisfies the following condition instead of the above condition (1):

$$4.7 < f_T/f_{1G} < 5.5 \quad (1')$$

Note that similar to the zoom lens system of the first aspect, condition (1), condition (1'), condition (5), condition (6) and condition (8) can be applied to the zoom lens system of the second aspect of the present invention.

The negative second lens group of the second aspect preferably satisfies the following condition:

$$-7 < f_T/f_{2G} < -5 \quad (5)$$

wherein $f_{2G}$ designates the focal length of the negative second lens group.

Also, similar to the first aspect of the present invention, the zoom lens system of the second aspect preferably satisfies the following condition:

$$3.2 < f_T/f_W \quad (6)$$

wherein $f_W$ designates the focal length of the zoom lens system at the short focal length extremity.

In the zoom lens system of the second aspect, the negative second lens group preferably includes a lens element having at least one aspherical surface, and the lens element satisfies the following condition:

$$0 < \Delta V_{ASP} < 0.6 \quad (8)$$

wherein $\Delta V_{ASP}$ designates the amount of change of the distortion coefficient due to the aspherical surface under the condition that the focal length at the short focal length extremity is converted to 1.0.

According to the zoom lens system of the second aspect, the positive first lens group includes cemented lens elements, and satisfies the following condition:

$$2.5 < f_T/f_C < 4.0 \quad (9)$$

wherein $f_C$ the focal length of the cemented lens elements.

Furthermore, the cemented lens elements preferably satisfy the following conditions:

$$3.5 < f_T/f_C < 5.5 \quad (10)$$

$$8 < v_P - v_N \quad (11)$$

wherein $$f_C = r_C/(n_P - n_N);$$

$r_C$ designates the radius of curvature of the bonding surface of the cemented lens elements;

$n_P$ designates the refractive index of a positive lens element of the cemented lens elements;

$n_N$ designates the refractive index of a negative lens element of the cemented lens elements;

$v_P$ designates the Abbe number of the positive lens element of the cemented lens elements; and $v_N$ designates the Abbe number of the negative lens element of the cemented lens elements.

The present disclosure relates to subject matter contained in Japanese Patent Applications No. 2002-174361 (filed on Jun. 14, 2002) and No. 2002-175393 (filed on Jun. 17, 2002) which are expressly incorporated herein in their entireties.

BRIEF DESCRIPTION OF THE DRAWINGS

The present invention will be discussed below in detail with reference to the accompanying drawings, in which:

FIG. 1 is a lens arrangement of a zoom lens system, at the short focal length extremity, according to a first embodiment of the present invention;

FIGS. 2A, 2B, 2C and 2D show aberrations occurred in the lens arrangement shown in FIG. 1;

FIGS. 3A, 3B, 3C and 3D show aberrations occurred in the lens arrangement shown in FIG. 1 at an intermediate focal length;

FIGS. 4A, 4B, 4C and 4D show aberrations occurred in the lens arrangement shown in FIG. 1 at the long focal length extremity;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIG. 9 is a lens arrangement of a zoom lens system, at the short focal length extremity, according to a third embodiment of the present invention;

FIGS. 10A, 10B, 10C and 10D show aberrations occurred in the lens arrangement shown in FIG. 9;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity;

FIGS. 15A, 15B, 15C and 15D show aberrations occurred in the lens arrangement shown in FIG. 13 at an intermediate focal length;

FIGS. 16A, 16B, 16C and 16D show aberrations occurred in the lens arrangement shown in FIG. 13 at the long focal length extremity;

FIG. 17 is a lens arrangement of a zoom lens system, at the short focal length extremity, according to a fifth embodiment of the present invention;

FIGS. 18A, 18B, 18C and 18D show aberrations occurred in the lens arrangement shown in FIG. 17;

FIGS. 19A, 19B, 19C and 19D show aberrations occurred in the lens arrangement shown in FIG. 17 at an intermediate focal length;

FIGS. 20A, 20B, 20C and 20D show aberrations occurred in the lens arrangement shown in FIG. 17 at the long focal length extremity;

FIG. 21 is a lens arrangement of a zoom lens system, at the short focal length extremity, according to a sixth embodiment of the present invention;

FIGS. 22A, 22B, 22C and 22D show aberrations occurred in the lens arrangement shown in FIG. 21;

FIGS. 23A, 23B, 23C and 23D show aberrations occurred in the lens arrangement shown in FIG. 21 at an intermediate focal length;

FIGS. 24A, 24B, 24C and 24D show aberrations occurred in the lens arrangement shown in FIG. 21 at the long focal length extremity;

DESCRIPTION OF THE PREFERRED EMBODIMENTS

Figure 25:
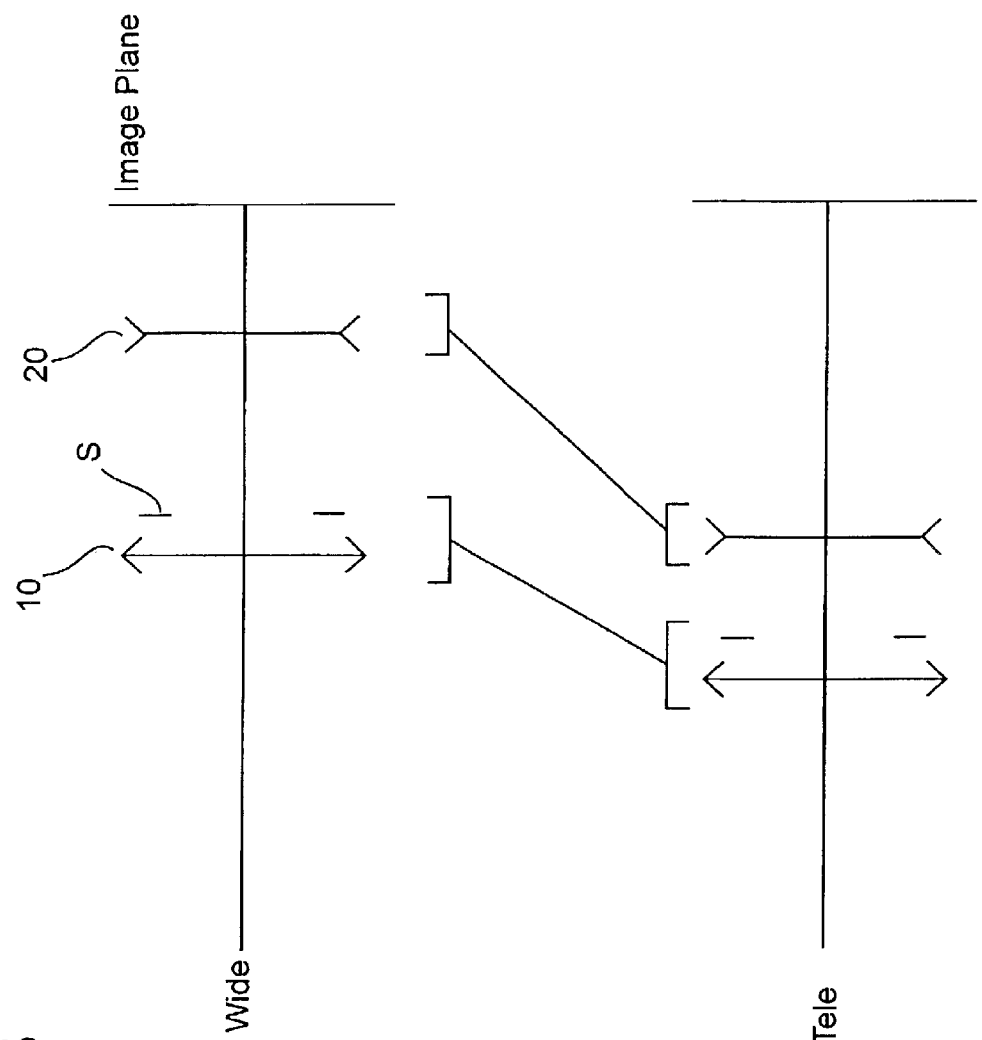
FIG. 25 shows a schematic lens-group moving paths of the zoom lens system according to the present invention.

The zoom lens system of the present invention includes, as shown in the schematic lens-group moving paths of FIG. 25, a positive first lens group 10, a diaphragm (aperture stop) S, and a negative second lens group 20, in this order from the object.

Upon zooming from the short focal length extremity (wide angle) to the long focal length extremity (telephoto), the positive first lens group 10 and the negative second lens group 20 monotonously move toward to the object. The diaphragm S moves together with the positive first lens group 10. Focusing is performed by the positive first lens group 10; and upon focusing the diaphragm S remains stationary.

Figure 5:
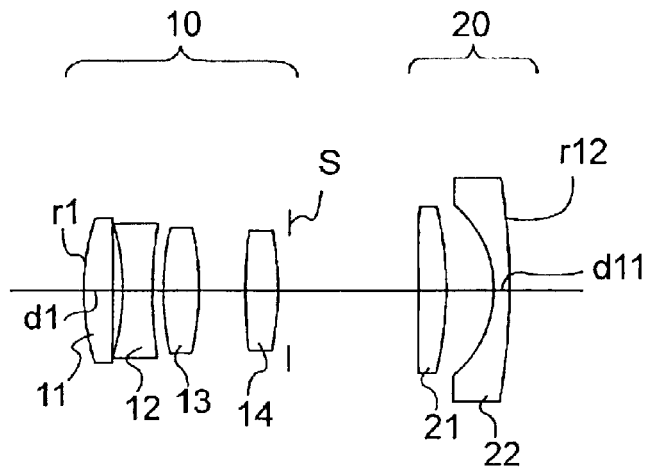
FIG. 5 is a lens arrangement of a zoom lens system, at the short focal length extremity, according to a second embodiment of the present invention.
Figure 6A:
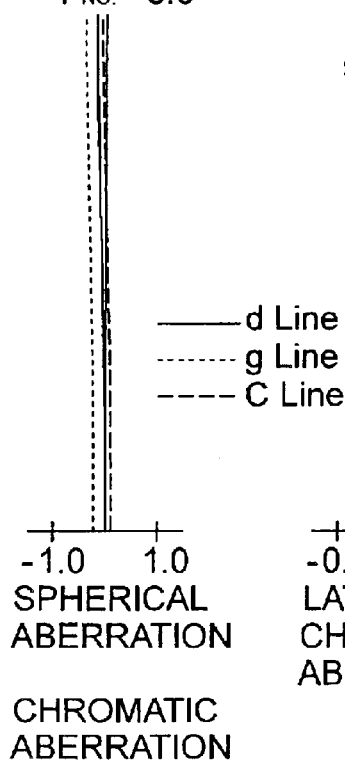
FIGS. 6A, 6B, 6C and 6D show aberrations occurred in the lens arrangement shown in FIG. 5.
Figure 6B:
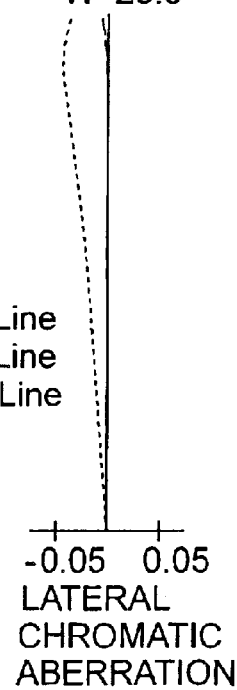
Figure 6C:
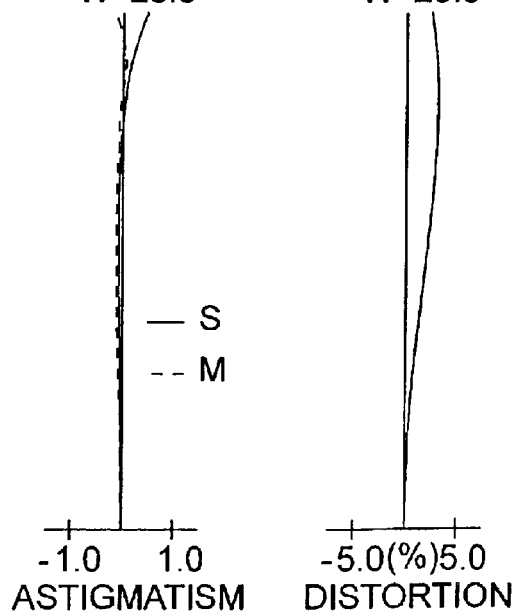
Figure 6D:
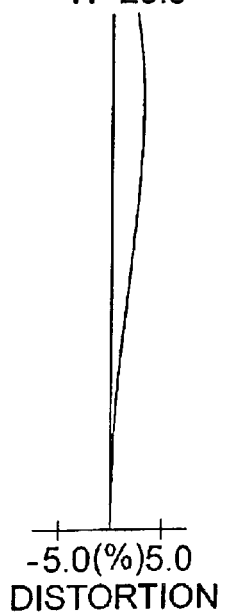

As shown in the lens arrangements of FIGS. 1, 5 and 9, i.e., the first to third embodiments corresponding to the first aspect of the present invention, the positive first lens group 10 includes a positive lens element 11 having a convex surface facing toward the object, a negative lens element 12, a positive lens element 13, and a positive lens element 14 having at least one aspherical surface, in this order from the object. The negative second lens group 20 includes a positive meniscus lens element 21 having the concave surface facing toward the object, and a negative meniscus lens element 22 having the concave surface facing toward the object, in this order from the object.

Figure 13:
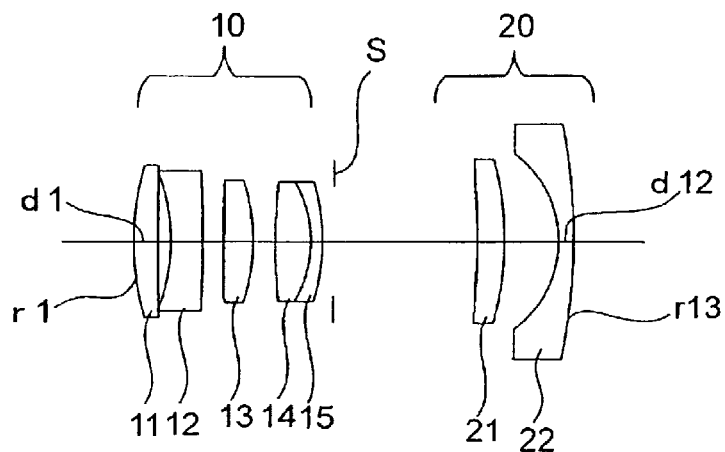
FIG. 13 is a lens arrangement of a zoom lens system, at the short focal length extremity, according to a fourth embodiment of the present invention.
Figure 14A:
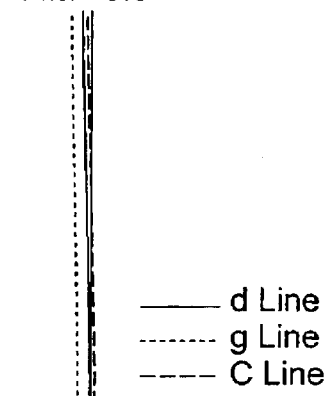
FIGS. 14A, 14B, 14C and 14D show aberrations occurred in the lens arrangement shown in FIG. 13.
Figure 14B:
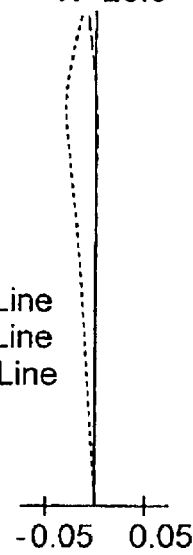
Figure 14C:
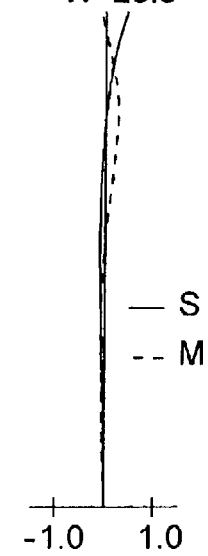
Figure 14D:
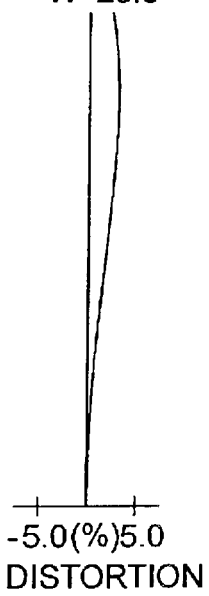

In addition to the above, as shown in the lens arrangements of FIGS. 13, 17 and 21, i.e., the fourth to sixth embodiments corresponding to the second aspect of the present invention, the positive first lens group 10 includes a positive meniscus lens element 11 having the convex surface facing toward the object, a negative meniscus lens element 12 having the concave surface facing toward the object, a positive biconvex lens element 13, a positive biconvex lens element 14, and a negative meniscus lens element 15 having the concave surface facing toward the object, in this order from the object. Note that the positive biconvex lens element 14 and the negative meniscus lens element 15 are cemented lens elements. The negative second lens group 20 includes a positive meniscus lens element 21 having the concave surface facing toward the object, and a negative meniscus lens element 22 having the concave surface facing toward the object, in this order from the object.

Condition (1) ((1')) specifies the focal length (power) of the positive first lens group 10.

A feature of the zoom lens system of the present invention is as follows: the power of the positive first lens group 10 is made stronger in order to reduce the traveling distance thereof, while a higher zoom ratio and further miniaturization are achieved under the condition of the two-lens-group arrangement.

By satisfying condition (1) ((1')), the traveling distance of the positive first lens group 10 can be made shorter, and further miniaturization of the zoom lens system can be attained.

If $f_T/f_{1G}$ exceeds the upper limit of condition (1) ((1')), the power of the positive first lens group 10 becomes too strong, which is advantageous for further miniaturization, and the traveling distance of each lens group can be made shorter; however, aberrations in the positive first lens group 10 become larger. As a result, the correcting of aberrations cannot be adequately made.

If $f_T/f_{1G}$ exceeds the lower limit of condition (1'), the power of the positive first lens group 10 becomes weaker, so that the traveling distance of each lens group becomes longer. Consequently, further miniaturization of the zoom lens system cannot be attained.

If $f_T/f_{1G}$ exceeds the lower limit of condition (1), the power of the positive first lens group 10 becomes further weaker, so that attaining the zoom ratio of 3.5 becomes difficult.

In the zoom lens system of the first aspect of the present invention, the most image-side lens element of the positive first lens group 10 is constituted by a positive lens element having at least one aspherical surface, and the positive lens element with the aspherical surface satisfies condition (2). It should be noted that the position of the aspherical surface, and satisfying condition (2) are important for reducing the occurrence of aberrations, especially spherical aberration.

In other words, in the case of a two-lens-group zoom lens system, even if an attempt is made to make the power of the positive first lens group 10 stronger and to reduce the traveling distance thereof upon zooming, aberrations, especially, spherical aberration, largely occur if the positive first lens group 10 is constituted by about four lens elements. In order to correct the occurrences of such aberrations, the positive first lens group 10 employs an the spherical surface at the most image-side lens element, i.e., the lens element closest to the diaphragm; and the aspherical surface is arranged to satisfy condition (2).

Condition (2) relates to the focal length of the positive lens element having the aspherical surface in the positive first lens group 10. By satisfying condition (2), the power of the positive first lens group 10 can be made stronger, the traveling distance thereof can be made shorter, and further miniaturization of the zoom lens system can be attained.

If $f_T/f_{Lasp}$ exceeds the upper limit of condition (2), the power of the positive lens element 14 having the aspherical surface becomes too strong, aberrations occurred in the positive lens element 14 become larger. Consequently, the correcting of aberration in the positive first lens group 10 becomes difficult.

If $f_T/f_{Lasp}$ exceeds the lower limit of condition (2), the power of the positive lens element 14 having the aspherical surface becomes weaker, so that the power of the positive first lens group 10 becomes weaker. Consequently, the traveling distance of the positive first lens group 10 becomes longer, and further miniaturization of the zoom lens system cannot be attained.

In the positive first lens group 10, in order to adequately correct aberrations while maintaining a small number of lens elements, the positive first lens group 10 is preferably constituted by four lens elements, i.e., a positive lens element 11 having a convex surface facing toward the object, a negative lens element 12, a positive lens element 13, and a positive lens element 14 having at least one aspherical surface, in this order from the object.

In regard to the positive third lens element 13 and the positive fourth lens element 14, it is more preferable to provide these lens elements with relatively even (uniform) power thereover, considering the amount of asphericity of the aspherical surface formed on the fourth positive lens element 14, than to provide an extreme difference in power between the positive third and fourth lens elements.

Condition (3) relates to the focal length (power) of the positive third lens element 13 of the positive first lens group 10 according to the above-explained consideration based on the amount of asphericity. By satisfying condition (3), the power of the positive first lens group 10 can be made stronger, the traveling distance thereof can be made shorter, and further miniaturization of the zoom lens system can be attained.

If $f_T/f_{L3}$ exceeds the upper limit of condition (3), the power in the positive third lens element 13 becomes stronger, so that aberration thereof becomes larger. As a result, the correcting of aberrations in the positive first lens group 10 becomes difficult.

If $f_T/f_{L3}$ exceeds the lower limit of condition (3), the power in the positive third lens element 13 becomes too weak, so that the power of the positive first lens group 10 becomes weaker. As a result, the traveling distance of the positive first lens group 10 becomes longer, and further miniaturization of the zoom lens system cannot be attained.

Condition (4) specifies the focal-length ratio of the positive third lens element 13 to the positive fourth lens element 14 with the aspherical surface, in the positive first lens group 10. By satisfying condition (4), the power of the positive first lens group 10 can be made stronger, and aberrations can be adequately corrected.

If $f_{Lasp}/f_{L3}$ exceeds the upper limit of condition (4), the power of the positive third lens element 13 becomes too strong, so that aberrations thereof become larger. Consequently, the correcting of aberrations in the positive first lens group 10 becomes difficult.

If $f_{Lasp}/f_{L3}$ exceeds the lower limit of condition (4), the power in the positive fourth lens element 14 with the aspherical surface becomes too strong, aberrations thereof become larger. Consequently, the correcting of aberrations in the positive first lens group 10 becomes difficult. Moreover, the amount of asphericity increases, so that manufacture of the positive fourth lens element with the aspherical surface becomes difficult.

Condition (5) specifies the focal length (power) of the negative second lens group 20. By satisfying condition (5), the traveling distance of the negative second lens group 20 can be made shorter, and further miniaturization of the zoom lens system can be attained.

If $f_T/f_{2G}$ exceeds the upper limit of condition (5), the power of the negative second lens group 20 becomes weaker, and the traveling distance thereof becomes longer, so that further miniaturization of the zoom lens system cannot be attained.

If $f_T/f_{2G}$ exceeds the lower limit of condition (5), the power of the negative second lens group 20 becomes too strong. The traveling distance of each lens group can be made shorter, which is advantageous for miniaturization of the zoom lens system; however, aberrations in the negative second lens group 20 increase, so that the correcting thereof becomes difficult.

Condition (6) specifies the ratio of the focal length of the zoom lens system at the short focal length extremity to the focal length thereof at the long focal length extremity. By satisfying condition (6), a high zoom ratio can be achieved.

If $f_T/f_W$ exceeds the lower limit of condition (6), a high zoom ratio cannot be achieved.

Condition (7) relates to the aspherical surface provided on the fourth positive lens element 14 of the positive first lens group 10. By satisfying condition (7), spherical aberrations can be adequately corrected.

If $\Delta I_{ASP}$ exceeds the upper limit of condition (7), the amount of asphericity increases, so that manufacture of the fourth lens element 14 becomes difficult.

If $\Delta I_{ASP}$ exceeds the lower limit of condition (7), the effect of the correcting of spherical aberration through the aspherical surface is small, so that sufficient correction cannot be achieved.

In the negative second lens group 20, a lens element having at least one aspherical surface is preferably employed. By employing an aspherical surface in the negative second lens group 20, the number of lens elements constituting the negative second lens group 20 can be reduced; and, especially, distortion at the short focal length extremity can be corrected.

Condition (8) relates to the above-explained aspherical surface in the negative second lens group 20.

If $\Delta V_{ASP}$ exceeds the lower limit of condition (8), the effect of the correcting of distortion through the aspherical surface becomes smaller, so that adequate correction cannot be achieved.

If $\Delta V_{ASP}$ exceeds the upper limit of condition (8), the amount of asphericity becomes larger, and manufacture of the lens element with the aspherical surface becomes difficult.

Note that the above-explained condition (1), condition (1'), condition (5), condition (6) and condition (8) can also be applied to the zoom lens system of the second aspect of the present invention. Furthermore, the zoom lens system of the second aspect of the present invention is arranged to satisfy the following conditions (9), (10) and Condition (9) relates to the focal length (power) of the cemented lens elements provided in the positive first lens group 10.

In order to provide a large power, such as one determined by condition (9), in the positive first lens group 10, a large positive power in the first lens group 10 is necessary. Such a large positive power is preferably provided in cemented lens elements having a negative lens element, from the viewpoint of the correcting of aberrations. Due to this arrangement, aberrations occurred in the positive first lens group 10 can be reduced; and in particular, spherical aberration and coma can be reduced. In other words, by satisfying condition (9), the power of the positive first lens group 10 is made stronger, and the traveling distance thereof can be made shorter. Consequently, further miniaturization of the zoom lens system can be attained.

If $f_T/f_C$ exceeds the upper limit of condition (9), the power of the cemented lens elements becomes too strong, so that aberrations in the cemented lens elements become larger. Consequently, the correcting of aberrations in the positive first lens group 10 become difficult.

If $f_T/f_C$ exceeds the lower limit of condition (9), the power of the cemented lens elements becomes weaker, so that the power of the positive first lens group 10 becomes weaker. Consequently, the traveling distance of the positive first lens group 10 becomes longer, so that further miniaturization of the zoom lens system cannot be attained.

Condition (10) relates to the bonding surface of the cemented lens elements. By utilizing a divergent surface which satisfies condition (10), spherical aberration in particular can be adequately corrected.

If $f_T/f_{C'}$ exceeds the upper limit of condition (10), the divergence of the bonding surface becomes too strong, so that spherical aberration thereat is over-corrected. Consequently, higher order aberrations occur.

If $f_T/f_{C'}$ exceeds the lower limit of condition (10), the effect of the divergence of the bonding surface is small, so that the effect of the correcting of spherical aberrations cannot be attained.

Condition (11) specifies the Abbe number of the cemented lens elements. By satisfying condition (11), chromatic aberrations can be adequately corrected.

If $v_P-v_N$ exceeds the lower limit of condition (11), the correcting of chromatic aberration, from the short focal length extremity over the long focal length extremity, especially, at the long focal length extremity, becomes difficult.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, F$_{NO}$ designates the f-number, f designates the focal length of the entire zoom lens system, f$_B$ designates the back focal distance, W designates the half angle-of-view (°), r designates the radius of curvature, d designates the lens-element thickness or distance between lens elements, N$_d$ designates the refractive index of the d-line, and v$_d$ designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Furthermore, the relationship between the aspherical coefficients and aberration coefficients is discussed as follows:

1. The shape of an aspherical surface is defined as follows:

$$x=cy^2/(1+[1\{1+K\}c^2y^2]^{1/2})+A4y^4+A6y^6+A8y^8+A10y^{10}\ldots$$

wherein:

x designates a distance from a tangent plane of an aspherical vertex;

y designates a distance from the optical axis;

c designates a curvature of the aspherical vertex (1/r),

K designates a conic constant;

2. In this equation, to obtain the aberration coefficients, the following substitution is made to replace K with "0" (Bi=Ai when K=0).

$$B4=A4+Kc^3/8;$$

$$B6=A6+(K^2+2K)c^5/16;$$

$$B8=A8+5(K^3+3K^2+3K)c^7/128$$

$$B10=A10+7(K^4+4K^3+6K^2+4K)c^9/256;$$ and therefore, the following equation is obtained:

$$x=cy^2/[1+[1-c^2y^2]^{1/2}]+B4y^4+B6y^6+B8y^8+B10y^{10}+\ldots$$

3. Furthermore, in order to normalize the focal length f to 1.0, the followings are considered:

X=x/f; Y=y/f; C=f*c;

$\alpha 4=f^3B4$; $\alpha 6=f^5B6$; $\alpha 8=f^7B8$; $\alpha 10=f^9B10$

Accordingly, the following equation is obtained.

$$X=CY^2/[1+[1-C^2Y^2]^{1/2}]+\alpha 4Y^4+\alpha 6Y^6+\alpha 8Y^8+\alpha 10Y^{10}+\ldots$$

4. $\Phi=8(N'-N)$ $\alpha 4$ is defined, and the third aberration coefficients are defined as follows:

I designates the spherical aberration coefficient;

II designates the coma coefficient;

III designates the astigmatism coefficient;

IV designates the curvature coefficient of the sagittal image surface; and

V designates a distortion coefficient; and therefore, the influence of the fourth-order aspherical-surface coefficient ($\alpha 4$) on each aberration coefficient is defined as:

$$\Delta I=h^4\Phi$$

$$\Delta II=h^3k\Phi$$

$$\Delta III=h^2k^2\Phi$$

$$\Delta IV=h^2k^2\Phi$$

$$\Delta V=hk^3\Phi$$

wherein h1 designates the height at which a paraxial axial light ray strikes the first surface of the lens system including the aspherical surface;

h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

[Embodiment 1]

Note that Embodiments 1 to 3 relate to the zoom lens system according to the first aspect of the present invention.

FIG. 1 is the lens arrangement of a zoom lens system, at the short focal length extremity, according to the first embodiment of the present invention. FIGS. 2A through 2D show aberrations occurred in the lens arrangement shown in FIG. 1. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows numerical data of the first embodiment.

The positive first lens group 10 includes a positive lens element 11 having a convex surface facing toward the object, a negative biconcave lens element 12, a positive biconvex lens element 13, and a positive lens element 14 having an aspherical surface on the image side (surface No. 8), in this order from the object.

The negative second lens group 20 includes a positive meniscus lens element 21 having the concave surface facing toward the object, and a negative meniscus lens element 22 having the concave surface facing toward the object, in this order from the object. A diaphragm S is provided 1.00 mm behind (on the image side) the first lens group 10 (surface No. 8).

TABLE 1

FNO = 1:5.6–8.0–13.4
W = 28.5–17.0–9.0
f = 39.00–70.00–136.00 (Zoom Ratio = 3.49)
$f_B$ = 8.37–33.76–87.82

| Surface | r | d | $N_d$ | $v_d$ |
|---|---|---|---|---|
| 1 | 19.845 | 2.30 | 1.51446 | 53.6 |
| 2 | 151.078 | 1.12 | — | — |
| 3 | −21.871 | 3.00 | 1.84700 | 40.8 |
| 4 | 58.683 | 1.64 | — | — |
| 5 | 35.149 | 2.81 | 1.48749 | 70.2 |
| 6 | −23.433 | 2.63 | — | — |
| 7 | 91.195 | 2.86 | 1.58913 | 61.2 |
| 8* | −27.441 | 14.41–7.01–2.50 | — | — |
| 9* | −55.136 | 2.53 | 1.58547 | 29.9 |
| 10 | −30.148 | 4.88 | — | — |
| 11 | −10.222 | 1.40 | 1.71974 | 53.4 |
| 12 | −45.788 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.23553 \times 10^{-4}$ | $0.17494 \times 10^{-6}$ | 0.00 |
| 9 | 0.00 | $0.67375 \times 10^{-4}$ | $0.34110 \times 10^{-6}$ | $0.12 \times 10^{-8}$ |

[Embodiment 2]

FIG. 5 is the lens arrangement of a zoom lens system, at the short focal length extremity, according to the second embodiment of the present invention. FIGS. 6A through 6D show aberrations occurred in the lens arrangement shown in FIG. 5. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows numerical data of the second embodiment. The basic lens arrangement of the second embodiment is the same as that of the first embodiment. A diaphragm S is provided 1.00 mm behind (on the image side) the first lens group 10 (surface No. 8).

TABLE 2

FNO = 1:5.6–8.0–13.4
W = 28.5–16.9–8.9
f = 39.00–70.00–138.00 (Zoom Ratio = 3.54)
$f_B$ = 9.58–33.91–87.27

| Surface | r | d | $N_d$ | $v_d$ |
|---|---|---|---|---|
| 1 | 22.249 | 2.61 | 1.53100 | 49.0 |
| 2 | −2083.101 | 0.89 | — | — |
| 3 | −21.554 | 2.70 | 1.83400 | 40.8 |
| 4 | 36.559 | 1.00 | — | — |
| 5 | 25.219 | 3.25 | 1.48749 | 70.2 |
| 6 | −25.219 | 4.20 | — | — |
| 7 | 51.821 | 2.86 | 1.58636 | 60.9 |
| 8* | −27.081 | 12.63–6.22–2.25 | — | — |
| 9* | −108.594 | 2.50 | 1.58547 | 29.9 |
| 10 | −31.790 | 4.28 | — | — |

TABLE 2-continued

FNO = 1:5.6–8.0–13.4
W = 28.5–16.9–8.9
f = 39.00–70.00–138.00 (Zoom Ratio = 3.54)
$f_B$ = 9.58–33.91–87.27

| Surface | r | d | $N_d$ | $v_d$ |
|---|---|---|---|---|
| 11 | −10.106 | 1.40 | 1.77250 | 49.6 |
| 12 | −63.995 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.25024 \times 10^{-4}$ | $0.20745 \times 10^{-6}$ | 0.00 |
| 9 | 0.00 | $0.76493 \times 10^{-4}$ | $0.40648 \times 10^{-6}$ | $0.15 \times 10^{-8}$ |

[Embodiment 3]

FIG. 9 is the lens arrangement of a zoom lens system, at the short focal length extremity, according to the third embodiment of the present invention. FIGS. 10A through 10D show aberrations occurred in the lens arrangement shown in FIG. 9. FIGS. 12A through 12D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows numerical data of the third embodiment. The basic lens arrangement of the third embodiment is the same as that of the first embodiment. A diaphragm S is provided 1.25 mm behind (on the image side) the first lens group 10 (surface No. 8).

TABLE 3

FNO = 1:5.6–8.0–13.4
W = 28.4–16.9–8.8
f = 39.00–70.00–140.00 (Zoom Ratio = 3.59)
$f_B$ = 9.44–34.01–89.47

| Surface | r | d | $N_d$ | $v_d$ |
|---|---|---|---|---|
| 1 | 21.550 | 2.61 | 1.51823 | 59.0 |
| 2 | 500.446 | 0.95 | — | — |
| 3 | −21.228 | 3.00 | 1.83481 | 42.7 |
| 4 | 37.767 | 1.00 | — | — |
| 5 | 26.079 | 3.25 | 1.48749 | 70.2 |
| 6 | −26.079 | 3.40 | — | — |
| 7 | 53.606 | 2.86 | 1.58636 | 60.9 |
| 8* | −25.651 | 13.27–6.61–2.43 | — | — |
| 9* | −132.202 | 2.50 | 1.58547 | 29.9 |
| 10 | −34.546 | 4.57 | — | — |
| 11 | −10.260 | 1.40 | 1.77250 | 49.6 |
| 12 | −61.852 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.26623 \times 10^{-4}$ | $0.16867 \times 10^{-6}$ | 0.00 |
| 9 | 0.00 | $0.71506 \times 10^{-4}$ | $0.37622 \times 10^{-6}$ | $0.10 \times 10^{-8}$ |

Note that Embodiments 4 to 6 relate to the zoom lens system according to the second aspect of the present invention.

[Embodiment 4]

FIG. 13 is the lens arrangement of a zoom lens system, at the short focal length extremity, according to the fourth embodiment of the present invention. FIGS. 14A through 14D show aberrations occurred in the lens arrangement shown in FIG. 13. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows numerical data of the fourth embodiment.

The positive first lens group 10 includes a positive meniscus lens element 11 having the convex surface facing toward the object, a negative meniscus lens element 12 having the concave surface facing toward the object, a biconvex positive lens element 13, a biconvex positive lens element 14, and a negative meniscus lens element 15 having the concave surface facing toward the object, in this order from the object. The biconvex positive lens element 14 and the negative meniscus lens element 15 are bonded each other.

The negative second lens group 20 includes a positive meniscus lens element 21 having the concave surface facing toward the object, and a negative meniscus lens element 22 having the concave surface facing toward the object, in this order from the object. A diaphragm S is provided 1.00 mm behind (on the image side) the first lens group 10 (surface No. 9).

TABLE 4

FNO = 1:5.6–8.0–13.4
f = 39.00–70.00–140.00 (Zoom Ratio = 3.59)
W = 28.5–17.0–8.8
$f_B$ = 8.40–33.44–89.97

| Surface | r | d | $N_d$ | $v_d$ |
|---|---|---|---|---|
| 1 | 25.248 | 2.30 | 1.50426 | 58.9 |
| 2 | 245.934 | 1.25 | — | — |
| 3 | −18.051 | 3.00 | 1.84228 | 41.8 |
| 4 | −131.296 | 1.99 | — | — |
| 5 | 316.650 | 2.80 | 1.48749 | 70.2 |
| 6 | −17.951 | 2.11 | — | — |
| 7 | 53.992 | 3.26 | 1.51045 | 54.8 |
| 8 | −11.389 | 1.10 | 1.83481 | 42.7 |
| 9 | −19.153 | 14.59–7.30–2.88 | — | — |
| 10* | −50.141 | 2.53 | 1.58547 | 29.9 |
| 11 | −29.358 | 5.11 | — | — |
| 12 | −10.287 | 1.40 | 1.69001 | 56.2 |
| 13 | −56.443 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.63270 \times 10^{-4}$ | $0.19368 \times 10^{-6}$ | $0.32000 \times 10^{-8}$ |

[Embodiment 5]

FIG. 17 is the lens arrangement of a zoom lens system, at the short focal length extremity, according to the fifth embodiment of the present invention. FIGS. 18A through 18D show aberrations occurred in the lens arrangement shown in FIG. 17. FIGS. 19A through 19D show aberrations occurred in the lens arrangement shown in FIG. 17 at an intermediate focal length. FIGS. 20A through 20D show aberrations occurred in the lens arrangement shown in FIG. 17 at the long focal length extremity. Table 5 shows numerical data of the fifth embodiment. The basic lens arrangement of the fifth embodiment is the same as that of the fourth embodiment. A diaphragm S is provided 1.00 mm behind (on the image side) the first lens group 10 (surface No. 9).

TABLE 5

FNO = 1:5.6–8.0–3.4
f = 39.00–70.00–142.00 (Zoom Ratio = 3.64)
W = 28.4–17.1–8.7
$f_B$ = 8.47–34.58–95.22

| Surface | r | d | $N_d$ | $v_d$ |
|---|---|---|---|---|
| 1 | 23.371 | 2.30 | 1.50818 | 55.6 |
| 2 | 87.812 | 1.39 | — | — |
| 3 | −17.448 | 3.00 | 1.84350 | 42.0 |
| 4* | −134.677 | 1.84 | — | — |
| 5 | 217.962 | 2.80 | 1.48749 | 70.2 |
| 6 | −17.451 | 1.09 | — | — |
| 7 | 53.010 | 3.26 | 1.50655 | 58.7 |
| 8 | −11.064 | 1.10 | 1.80400 | 46.6 |
| 9 | −18.975 | 15.53–7.85–2.95 | — | — |
| 10* | −44.150 | 2.53 | 1.58547 | 29.9 |
| 11 | −26.890 | 5.17 | — | — |
| 12 | −10.326 | 1.40 | 1.69000 | 56.2 |
| 13 | −49.389 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.58705 \times 10^{-4}$ | $0.21617 \times 10^{-6}$ | $0.30000 \times 10^{-8}$ |

[Embodiment 6]

FIG. 21 is the lens arrangement of a zoom lens system, at the short focal length extremity, according to the sixth embodiment of the present invention. FIGS. 22A through 22D show aberrations occurred in the lens arrangement shown in FIG. 21. FIGS. 23A through 23D show aberrations occurred in the lens arrangement shown in FIG. 21 at an intermediate focal length. FIGS. 24A through 24D show aberrations occurred in the lens arrangement shown in FIG. 21 at the long focal length extremity. Table 6 shows numerical data of the sixth embodiment. The basic lens arrangement of the sixth embodiment is the same as that of the fourth embodiment. A diaphragm S is provided 1.00 mm behind (on the image side) the first lens group 10 (surface No. 9).

TABLE 6

FNO = 1:5.6–8.0–13.4
f = 39.00–70.00–145.00 (Zoom Ratio = 3.72)
W = 28.4–17.0–8.5
$f_B$ = 8.45–33.90–95.47

| Surface | r | d | $N_d$ | $v_d$ |
|---|---|---|---|---|
| 1 | 24.753 | 2.30 | 1.51171 | 54.5 |
| 2 | 120.230 | 1.35 | — | — |
| 3 | −17.654 | 3.00 | 1.82358 | 41.1 |
| 4 | −146.581 | 2.03 | — | — |
| 5 | 145.186 | 2.80 | 1.48749 | 70.2 |
| 6 | −17.812 | 1.52 | — | — |

TABLE 6-continued

FNO = 1:5.6–8.0–13.4
f = 39.00–70.00–145.00 (Zoom Ratio = 3.72)
W = 28.4–17.0–8.5
$f_B$ = 8.45–33.90–95.47

| Surface | r | d | $N_d$ | $v_d$ |
|---|---|---|---|---|
| 7 | 54.663 | 3.26 | 1.50120 | 58.1 |
| 8 | −11.122 | 1.10 | 1.80400 | 46.6 |
| 9 | −19.124 | 15.08–7.73–2.94 | — | — |
| 10* | −45.598 | 2.53 | 1.58547 | 29.9 |
| 11 | −27.307 | 5.05 | — | — |
| 12 | −10.204 | 1.40 | 1.69000 | 56.2 |
| 13 | −52.174 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.62960 \times 10^{-4}$ | $0.23445 \times 10^{-6}$ | $0.30000 \times 10^{-8}$ |

Table 7 shows the numerical values of each condition for each embodiment.

TABLE 7

|  | Embod. 1 | Embod. 2 | Embod. 3 |
|---|---|---|---|
| Condition (1) | 4.82 | 5.15 | 5.15 |
| Condition (2) | 3.76 | 4.49 | 4.67 |
| Condition (3) | 4.64 | 5.22 | 5.13 |
| Condition (4) | 1.23 | 1.16 | 1.10 |
| Condition (5) | −5.89 | −6.56 | −6.50 |
| Condition (6) | 3.49 | 3.54 | 3.59 |
| Condition (7) | −6.09 | −6.23 | −7.26 |
| Condition (8) | 0.42 | 0.35 | 0.35 |
|  | Embod. 4 | Embod. 5 | Embod. 6 |
| Condition (1) | 5.00 | 5.01 | 5.16 |
| Condition (5) | −6.19 | −5.95 | −6.29 |
| Condition (6) | 3.59 | 3.64 | 3.72 |
| Condition (8) | 0.40 | 0.41 | 0.42 |
| Condition (9) | 3.46 | 3.57 | 3.50 |
| Condition (10) | 3.99 | 3.82 | 3.95 |
| Condition (11) | 12.11 | 12.12 | 11.50 |

As can be understood from Table 7, the numerical values in the first through third embodiments satisfy conditions (1) through (8), and as can be understood from the drawings, the various aberrations can be adequately corrected.

According to the above description, a zoom lens system for a small and compact camera, including a two-lens-group arrangement and having a zoom ratio of approximately 3.5, can be obtained.

What is claimed is:

1. A zoom lens system comprising:
   a positive first lens group including a positive lens element having a convex surface facing an object, a negative lens element, a positive lens element, and a positive lens element having at lease one aspherical surface, in this order from the object and;
   a negative second lens group, in this order from the object, wherein zooming is performed by moving said first and second lens groups in the optical axis direction thereof; and
   wherein said zoom lens system satisfies the following conditions:

$4.5 < f_T/f_{1G} < 5.5$ $4 < f_T/f_{L3} < 6$ $3.5 < f_T/f_{Lasp} < 5.5$ wherein
   $f_T$ designates the focal length of said zoom lens system at the long focal length extremity;
   $f_{L3}$ designates the focal length of a third lens element from said object in said positive first lens group;
   $f_{1G}$ designates the focal length of said positive first lens group; and
   $f_{Lasp}$ designates the focal length of said positive lens element having said aspherical surface in said positive first lens group.

2. The zoom lens system according to claim 1, satisfying the following condition:

$1 < f_{Lasp}/f_{L3} < 1.5$.

3. The zoom lens system according to claim 1, satisfying the following condition:

$-7 < f_T/f_{2G} < -5$ wherein
   $f_{2G}$ designates the focal length of said negative second lens group.

4. The zoom lens system according to claim 1, satisfying the following condition:

$3.2 < f_T/f_W$ wherein
   $f_W$ designates the focal length of said zoom lens system at the short focal length extremity.

5. The zoom lens system according to claim 1, wherein said positive lens element having said aspherical surface in said positive first lens group satisfies the following condition:

$-10 < \Delta I_{ASP} < -3$ wherein
   $\Delta I_{ASP}$ designates the amount of change of the spherical aberration coefficient due to the aspherical surface under the condition that the focal length at the short focal length extremity is converted to 1.0.

6. The zoom lens system according to claim 1, wherein said negative second lens group comprises a lens element having at least one aspherical surface, and said lens element satisfies the following condition:

$0 < \Delta V_{ASP} < 0.6$ wherein
   $\Delta V_{ASP}$ designates the amount of change of the distortion coefficient due to the aspherical surface under the condition that the focal length at the short focal length extremity is converted to 1.0.

7. A zoom lens system comprising a positive first lens group having cemented lens elements, a negative second lens group, in this order from an object, wherein zooming is performed by moving said first and second lens groups in the optical axis direction thereof; wherein said zoom lens system satisfies the following conditions:

$$4.5 < f_T/f_{1G} < 5.5$$

$$2.5 < f_T/f_C < 3.5$$

$$3.5 < f_T/f_{C'} < 5.5$$

$$8 < \nu_P - \nu_N$$

$$3.2 < f_T/f_W$$

wherein $f_T$ designates the focal length of said zoom lens system at the long focal length extremity;

$f_{1G}$ designates the focal length of said positive first lens group;

$f_C$ designates the focal length of said cemented lens elements;

$f_{C'} = r_C/(n_P - n_N)$;

$r_C$ designates the radius of curvature of the bonding surface of said cemented lens elements;

$n_P$ designates the refractive index of a positive lens element of said cemented lens elements;

$n_N$ designates the refractive index of a negative lens element of said cemented lens elements;

$\nu_P$ designates the Abbe number of said positive lens element of said cemented lens elements; and $\nu_N$ designates the Abbe number of said negative lens element of said cemented lens elements; and $f_W$ designates the focal length of said zoom lens system at the short focal length extremity.

8. The zoom lens system according to claim 7, satisfying the following condition:

$$-7 < f_T/f_{2G} < -5$$

wherein $f_{2G}$ designates the focal length of said negative second lens group.

9. The zoom lens system according to claim 8, wherein said negative second lens group comprises a lens element having at least one aspherical surface, and said lens element satisfies the following condition:

$$0 < \Delta V_{ASP} < 0.6$$

wherein $\Delta V_{ASP}$ designates the amount of change of the distortion coefficient due to the aspherical surface under the condition that the focal length at the short focal length extremity is converted to 1.0.

* * * * *